United States Patent
Lum et al.

(10) Patent No.: US 9,633,469 B2
(45) Date of Patent: Apr. 25, 2017

(54) CONSERVATIVE RASTERIZATION OF PRIMITIVES USING AN ERROR TERM

(71) Applicant: NVIDIA Corporation, Santa Clara, CA (US)

(72) Inventors: Eric Brian Lum, San Jose, CA (US); Walter Robert Steiner, Flagler Beach, FL (US); Henry Packard Moreton, Woodside, CA (US); Justin L. Cobb, Toney, AL (US); Barry Nolan Rodgers, Madison, AL (US); Yury Uralsky, Santa Clara, CA (US); Timo Oskari Aila, Tuusula (FI); Tero Tapani Karras, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 661 days.

(21) Appl. No.: 13/844,093

(22) Filed: Mar. 15, 2013

(65) Prior Publication Data
US 2014/0267238 A1    Sep. 18, 2014

(51) Int. Cl.
*G06T 3/40* (2006.01)
*G06T 15/10* (2011.01)
*G06T 11/20* (2006.01)

(52) U.S. Cl.
CPC .............. *G06T 15/10* (2013.01); *G06T 3/403* (2013.01); *G06T 11/203* (2013.01)

(58) Field of Classification Search
CPC ...... G06T 11/40; G06T 11/001; G06T 11/203; G06T 15/005; G06T 15/80; G06T 2210/12
See application file for complete search history.

(56) References Cited

U.S. PATENT DOCUMENTS

| | | | | |
|---|---|---|---|---|
| 5,673,371 A  * |  9/1997 | Koopman | ............... | G06K 15/02 345/467 |
| 6,057,855 A  * |  5/2000 | Barkans | ......................... | 345/629 |
| 6,317,525 B1 * | 11/2001 | Aleksic et al. | ............... | 382/299 |
| 6,636,215 B1 * | 10/2003 | Greene | .................. | G06T 15/405 345/422 |
| 7,382,368 B1 * |  6/2008 | Molnar | ..................... | G06T 9/00 345/418 |
| 2003/0122850 A1* |  7/2003 | Koneru et al. | ................. | 345/620 |
| 2004/0246251 A1* | 12/2004 | Fenney et al. | ................. | 345/426 |

(Continued)

OTHER PUBLICATIONS

Lloyd, Brandon, "Triangle Rasterization", University of North Carolina at Chapel Hill, Spring 2007, URL https://www.google.com/url?sa=t&rct=j&q=&esrc=s&source=web&cd=8&cad=rja&uact=8&sqi=2&ved=0CDoQFjAH&url=http%3A%2F%2Fwww.cs.unc.edu%2F~blloyd%2Fcomp770%2FLecture08.pdf&ei=Pij3VKKbEcyYgwSnk4SgCg&usg=AFQjCNFXKTK6b3Er5wgwlWSVPDrXUwNolg&sig2=vOltodv1E.*

(Continued)

*Primary Examiner* — Jacinta M Crawford
*Assistant Examiner* — Diane Wills
(74) *Attorney, Agent, or Firm* — Zilka-Kotab, PC

(57) ABSTRACT

A system, method, and computer program product are provided for conservative rasterization of primitives using an error term. In use, an edge equation is determined for each edge of a primitive, the edge equation having coefficients defining the edge of the primitive. Each edge of the primitive is shifted to enlarge the primitive by modifying coefficients of the edge equation defining the edge by an error term that is a predetermined amount. Pixels that intersect the primitive are then determined using the enlarged primitive.

17 Claims, 9 Drawing Sheets

(56) References Cited

U.S. PATENT DOCUMENTS

2014/0253555 A1    9/2014  Lum et al.
2014/0267232 A1    9/2014  Lum et al.

OTHER PUBLICATIONS

McCool, Michael D., Chris Wales, and Kevin Moule, "Incremental and hierarchical Hilbert order edge equation polygon rasterization", Proceedings of the ACM SIGGRAPH/Eurographics workshop on Graphics hardware, ACM, 2001.*
Hasselgren, Jon, Performance Improvements for the Rasterization Pipeline, Lund University, 2009.*
Examination Report from German Patent Application No. 10 2013 114 090.4, dated Nov. 14, 2014.
Hasselgren, J. et al., "Conservative Rasterization," GPU Gems 2, NVIDIA Corporation, Chapter 42, 2005, pp. 1-18, retrieved from http://http.developer.nvidia.com/GPUGems2/gpugems2_chapter42.html.
Akenine-Moller, T. et al., "Conservative and Tiled Rasterization Using a Modified Triangle Setup," 2005, pp. 1-7.
Hasselgren, J. et al., "Peformance Improvements for the Rasterization Pipeline," 2009, pp. 1-18 and 47-61.
Laine, S. et al., "High-Perfomance Software Rasterization on GPUs," ACM, Aug. 5-7, 2011, pp. 79-88.
Hertel, S. et al., "A Hybrid GPU Rendering Pipeline for Alias-Free Hard Shadows," Eurographics, 2009, pp. 1-8.
Taiwanese Office Action in Patent Application No. 102148772, mailed on Jun. 30, 2015.

* cited by examiner

CONSERVATIVE RASTERIZATION OF PRIMITIVES USING AN ERROR TERM

FIELD OF THE INVENTION

The present invention relates to graphics processing, and, more particularly, to rasterization of primitives.

BACKGROUND

A graphics processing pipeline converts input graphics data (e.g. that may be associated with three-dimensional objects) into pixel data that is associated with a two-dimensional surface. In conventional implementations, a world-space portion of the graphics processing pipeline is responsible for processing the input graphics data, which is usually composed of a collection of triangles and related vertices, prior to when the data is converted into pixel data. A screen-space portion of the graphics processing pipeline is responsible for processing the converted pixel data and generating final pixel values for display.

One of the stages in the graphics processing pipeline is the rasterization stage, which typically involves converting the graphics data processed by the world-space portion of the pipeline into pixel data. Rasterization may involve generating edge equations that describe the edges of triangles processed in the world-space portion of the pipeline, determining coverage information for those triangles, and computing attribute values for the pixels and fragments covered by the triangles. The calculations involved in rasterization are sometimes fixed point calculations that are normally performed with a fixed fractional-pixel precision. Thus, the results of fixed point rasterization calculations can be thought of as "snapped" to a grid, where the boxes of the grid correspond to boxes of fractional-pixel size.

In many implementations, a graphics processing pipeline may rasterize the same three-dimensional object at different resolutions. For example, a triangle may first be rasterized at a low resolution to make certain determinations about the triangle, such as what general portions of a surface are covered by the triangle. The triangle may subsequently be rasterized at a higher resolution to generate image data for display. However, rasterization conducted at a lower resolution generally provides results that are "snapped" to a coarser grid than rasterization conducted at a higher resolution. Therefore, lower resolution rasterization may produce coverage results that do not properly align with the coverage results of higher resolution rasterization. For example, if frame buffer memory is allocated for sparse rendering based on the results of low resolution rasterization, memory may be over-allocated or under-allocated due to the fact that the results of lower-resolution rasterization are snapped to a coarser grid. More specifically, memory may be allocated for blocks for which no allocation is necessary, or memory may fail to be allocated for blocks for which allocation is necessary.

Thus, there is a need for addressing accuracy issues when rasterizing graphics data and/or for addressing other issues associated with the prior art.

SUMMARY

A system, method, and computer program product are provided for conservative rasterization of primitives using an error term. In use, an edge equation is determined for each edge of a primitive, the edge equation having coefficients defining the edge of the primitive. Each edge of the primitive is shifted to enlarge the primitive by modifying coefficients of the edge equation defining the edge by an error term that is a predetermined amount. Pixels that intersect the primitive are then determined using the enlarged primitive.

DETAILED DESCRIPTION

Conservative rasterization is a rasterization technique where, if any area of a pixel is intersected by a primitive, the pixel is considered for rasterization of the primitive. This differs from traditional rasterization techniques that consider a pixel as a sample point or multiple sample points, and, if the sample point(s) are inside the primitive, the sample point(s) are considered for rasterization of the primitive. With conservative rasterization, all pixels that actually intersect the primitive will always be identified. However, the conservative rasterization process may identify pixels as intersecting a primitive, that with perfect precision, would not be identified as intersecting the primitive. It should be noted that in the present description, pixels are considered to occupy a rectangular area of a display, and each primitive may be a triangle, line, or point.

Conservative rasterization is useful to allow a graphics processing unit (GPU) to quickly identify the pixels that intersect a primitive so that they can be used by other resources to further do complex computations on the pixel. For example, a GPU with conservative rasterization capability can quickly find the pixels that may be intersected by a primitive, send those pixels to another compute resource, and perform computations that the fixed function pipelines in the GPU may not have the capability to perform. An example of this is extremely fine multisampling for antialiasing. If the GPU is configured to perform multisampling up to 4×4 samples per-pixel, another computational resource may be configured to perform multisampling when more than 4×4 samples per-pixel are used, e.g., 16×16 multisampling. The 16×16 multisampling may be performed by programmable shader resources within the GPU itself, or may be performed in another chip or computing resource, such as a CPU (central processing unit). Other examples that may benefit from conservative rasterization at low resolution to partition a processing workload include ray tracing, or global illumination where a pixels that intersect a primitive are identified, then complex or customized illumination computations are performed to determine the actual color of the pixels.

When conservative rasterization is used, the primitive positions are snapped to a grid. When the pixel resolution changes, becoming finer or coarser, the snapping can affect the shape of the primitives. In other words the shape of the primitives is inconsistent for different pixel resolutions, therefore the pixels that are considered to be covered by the primitives may vary for different pixel resolutions.

Figure 1:
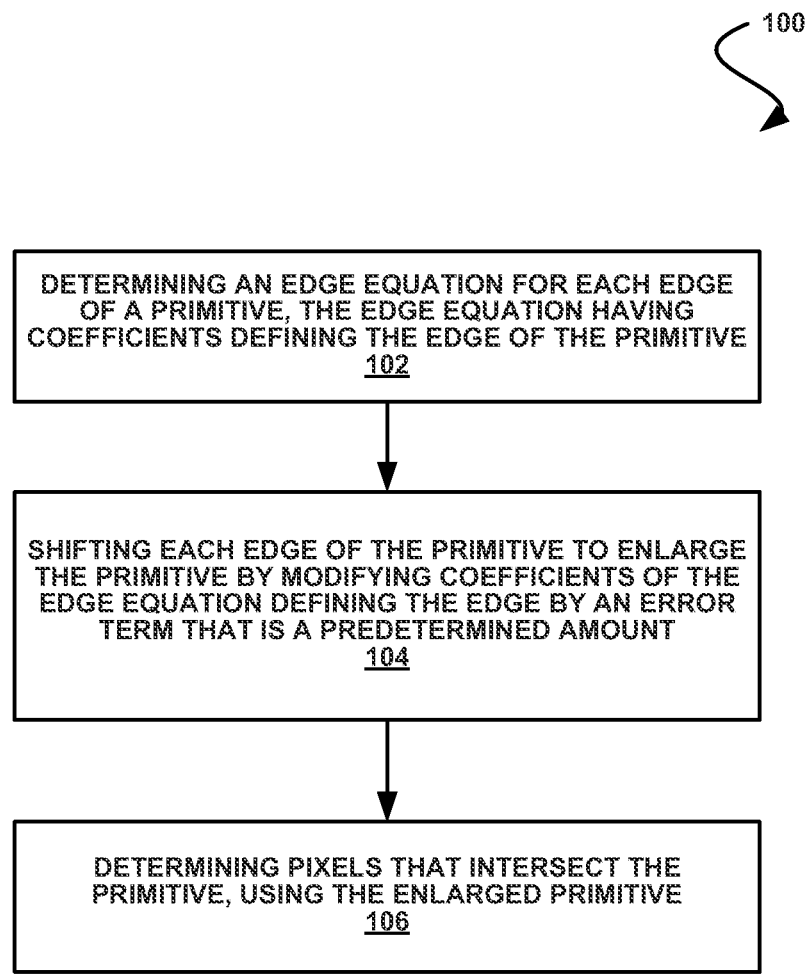
FIG. 1 illustrates a flowchart of a method for conservative rasterization of primitives using an error term, in accordance with one embodiment.

FIG. 1 illustrates a flowchart of a method 100 for conservative rasterization of primitives using an error term, in accordance with one embodiment. Such error term may be used to compensate for the aforementioned conservative rasterization inconsistency. At step 102, an edge equation is determined for each edge of a primitive, the edge equation having coefficients defining the edge of the primitive.

For example, a triangular primitive may be defined by a set of edges. Further, each edge of the primitive can be defined by three coefficients for an equation that describes the placement of the primitive on the display. The equation may be defined as:

$$Eo+Ex(x)+Ey(y)$$

The coefficients may be computed from vertices of the primitive that have been transformed into screen space. In one embodiment, the vertices may have been snapped to a fixed number of fractional bits (e.g. 8 bits) in order to enable exact precision in raster computations and thus uniform precision across the display. Thus, the coefficients may define the placement of a snapped edge.

Further, the coefficients and resulting edge equations may be computed such that if any point (x,y), is on the line (i.e. edge), the edge equation result will be zero. If (x,y) is on the side of line that the primitive lies, the result is will be positive, and on the other side of the edge, negative. So if a point (x,y) computes to positive for all 3 edges, the point is inside the primitive.

In step 104, each edge of the primitive is shifted to enlarge the primitive by modifying coefficients of the edge equation defining the edge by an error term that is a predetermined amount. As noted above, this error term may be used for the purpose of compensating for inconsistencies introduced by snapping primitives to a grid during the conservative rasterization process. The error term may also be used to compensate for precision discrepancies of the arithmetic operations that applied to the primitives. As an option, the error term may be programmable, such that for example the value of the error term is a function of the amount of precision introduced by the conservative rasterization process. Just by way of example, where the inconsistency is, at least in part, introduced by virtue of the above described snapping of the primitive, the error term may be a function of the distance by which each edge of the primitive has been snapped, where the edge is snapped by virtue of the edge being defined by the snapped vertices. In one optional embodiment, the error term may be one half of the distance by which each edge of the primitive has been snapped. Further, the same error term may be used to modify the coefficients.

It should be noted that the coefficients may be modified by the predetermined amount in any preconfigured manner that results in the enlargement of the primitive. For example, when the predetermined amount indicative of the error term is a power of 2, then the coefficients of the edge equation may be modified by shifting the coefficients of the edge equation based on the predetermined amount. As another example, the coefficients may be modified by the predetermined amount according to the following equation:

$$Eo+Ex(x+/-\text{ErrorX})+Ey(y+/-\text{ErrorY})$$

In the equation shown above, the error term may be selectively added or subtracted from the coefficients. In particular, the error term may be chosen to enlarge the primitive by the error term. Table 1 illustrates an exemplary configuration for selecting the sign (+ or −) of each applied error term, namely where the signs are based on the direction and orientation of the edge.

TABLE 1

| Eo Sign | Ex Sign | Ey Sign | Corner | X+/− | Y+/− |
|---------|---------|---------|--------|------|------|
| 0 | 0 | 0 | Upper right | − | + |
| 0 | 0 | 1 | Lower right | + | + |
| 0 | 1 | 0 | Upper Left | − | − |
| 0 | 1 | 1 | Lower Left | + | − |
| 1 | 0 | 0 | Lower left | + | − |
| 1 | 0 | 1 | Upper left | − | − |
| 1 | 1 | 0 | Lower right | + | + |
| 1 | 1 | 1 | Upper right | − | + |

In step 106, pixels that intersect the primitive are then determined using the enlarged primitive. As an option, only a subset of pixels may be analyzed according to step 106. For example, step 106 may be performed with respect to a fine raster process, and further may be performed only for pixels of multi-pixel tiles determined during a coarse raster process to intersect the primitive. More information regarding such coarse raster process will be provided below.

In one embodiment, a pixel may be determined to at least potentially intersect the primitive when it is determined that not all corners of the pixel are on the negative side of any edge of the enlarged primitive, or in other words that all four corners of the pixel are not outside any edge of the enlarged primitive. Where step 106 only determines that a pixel may potentially intersect the primitive, further processing may be performed to determine whether the pixel actually intersects the primitive. Such further processing will be described in more detail below.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
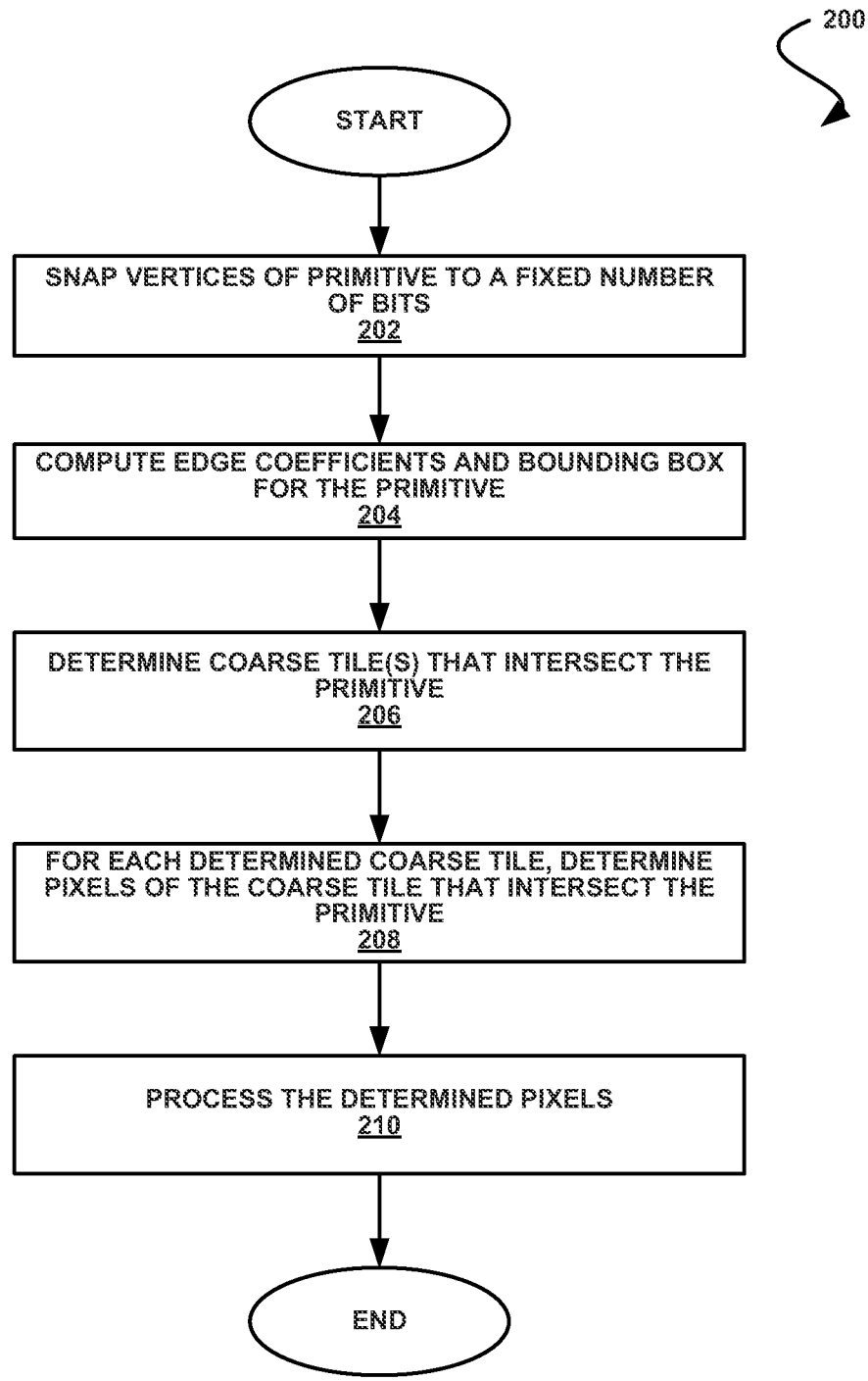
FIG. 2 illustrates a flowchart of a method for conservative rasterization of primitives in both a coarse raster and a fine raster, in accordance with another embodiment.

FIG. 2 illustrates a flowchart of a method 200 for conservative rasterization of primitives in both a coarse raster and a fine raster, in accordance with another embodiment. As an option, the present method 200 may be carried out in the context of the functionality of FIG. 1. Of course, however, the method 200 may be carried out in any desired environment. It should also be noted that the aforementioned definitions may apply during the present description.

In step 202, vertices of a primitive are snapped to a fixed number of bits. Additionally, in step 204, edge coefficients and a bounding box are computed for the primitive. Thus, the edge coefficients and bounding box may reflect the placement of the primitive once snapped. In the present description, the bounding box may be the minimum or smallest rectangle that bounds (i.e. encloses) the primitive.

In step 206, one or more coarse tiles that intersect the primitive are determined. The coarse tiles may be any block of pixels of a preconfigured size (e.g. 16×16 pixels). The primitive may be scanned in coarse tile steps to determine whether each tile intersects the primitive. It may be determined that the primitive intersects the coarse tile if: 1) the bounding box must intersect the coarse tile, and 2) not all corners of the coarse tile are on the negative side of any edge of the primitive. As an option (not shown), for each coarse tile determined to intersect the primitive, it may further be determined whether each fine tile (e.g. 8×8 pixels) making up the coarse tile intersects the primitive.

For each determined coarse tile, the pixels of the coarse tile that intersect the primitive are also determined. Note step 208. Where the intersecting fine tiles have been determined (not shown), the pixels of each intersecting fine tile that intersect the primitive may alternatively be determined. During conservative rasterization, a pixel may be determined to intersect the primitive if any part of the pixel area touches the primitive.

To this end, a hierarchical technique may be used to determine the pixels that intersect the primitive. Namely, the coarse tiles that intersect the primitive are determined in step 206, and further in step 208, for each determined coarse tile, the pixels of such coarse tile that intersect the primitive are determined. In step 210, the determined pixels are processed. Examples of such processing are described below with reference to FIG. 4.

Figure 3A:
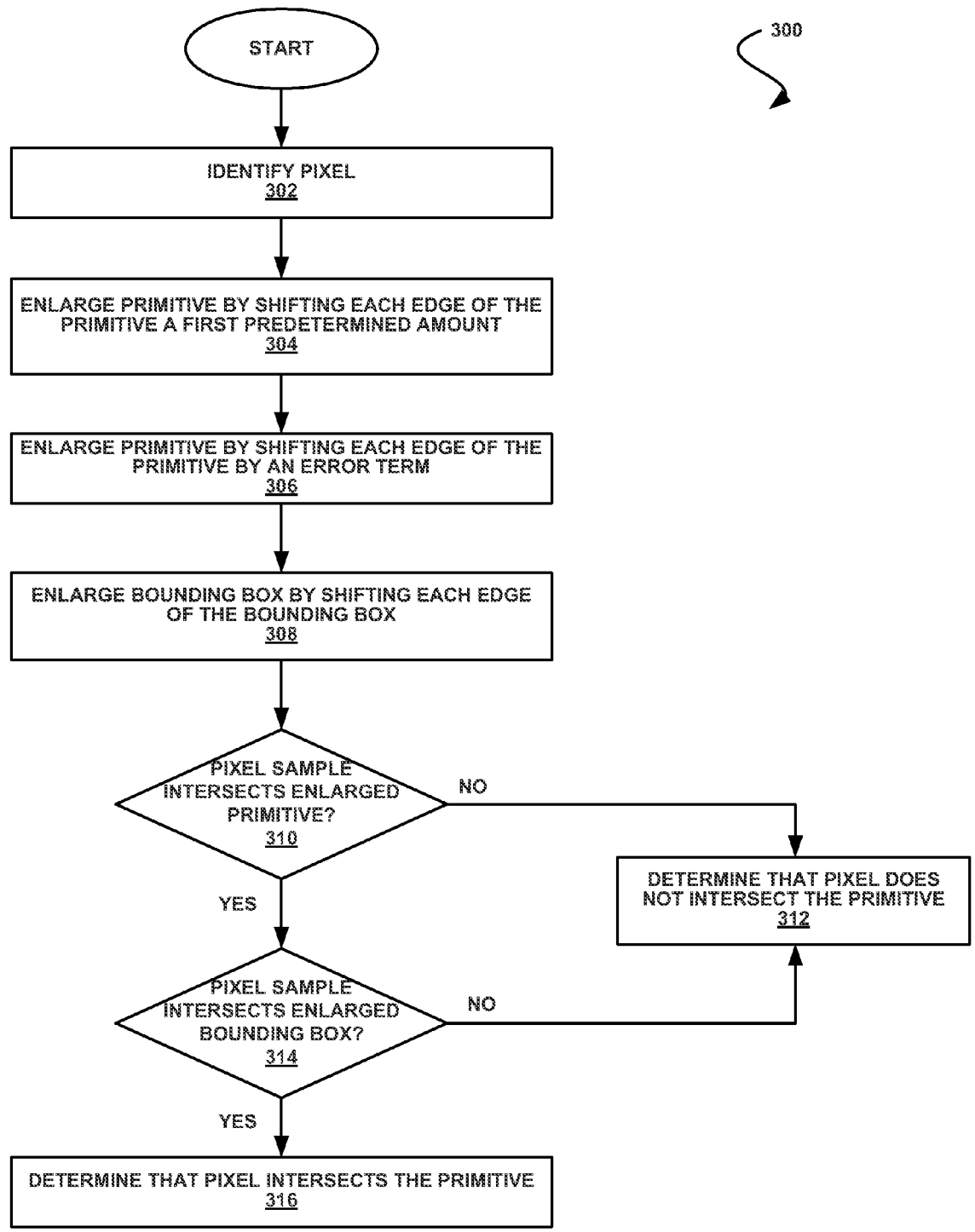
FIG. 3A illustrates a flowchart of a method for conservative rasterization of primitives in a fine raster using an error term, in accordance with yet another embodiment.

FIG. 3A illustrates a flowchart of a method 300 for conservative rasterization of primitives in a fine raster using an error term, in accordance with yet another embodiment. As an option, the present method 300 may be carried out in the context of the functionality of FIGS. 1-2. For example, the method 300 may be carried during step 208 of FIG. 2. Of course, however, the method 300 may be carried out in any desired environment. Again, it should be noted that the aforementioned definitions may apply during the present description.

In step 302, a pixel is identified. For example, the pixel may be included in a coarse tile previously determined to intersect a primitive. To conservatively determine whether the pixel intersects the primitive, instead of basing the determination on a number of sample points as is done in traditional rasterization techniques, the corners of the pixel may be used as a basis for the intersection determination. Further, only one of the four corners needs to be computed per edge, as long as the correct corner is selected. In other words, if the correct corner is selected, only that corner needs to be tested against the primitive. The correct corner to select is the one farthest from the edge that lies on the same side of the edge as the primitive. The direction and orientation of the edge can be determined by the signs of the edge coefficients as shown in the Table 1 above. Depending on how the edges are defined and the coordinate system, the signs can be different, but the idea is the same.

To effectively test the selected corner, in step 304, the primitive is enlarged by shifting each edge of the primitive a first predetermined amount. For example, the traditional aliased rasterizer has one sample point defined in the center of the pixel. The conservative raster of the present method 300 may be implemented by shifting the center sample to the selected corner per edge of the primitive, or in other words by shifting each edge of the primitive in the proper direction by the first predetermined amount, to make the center sample look like a corner point. The first predetermined amount may be a predetermined fraction of a size of a pixel, such as one half of the size of the pixel.

Specifically, step 304 may includes modifying coefficients of the edge equation defining the edge by the first predetermined amount, in order to enlarge the primitive. The following equation shows an example of a technique for modifying the coefficients to shift the primitive:

$$Eo+Ex(x+/-0.5)+Ey(y+/-0.5)=Eo'+Ex(x)+Ey(y)$$

where $Eo'=(Eo+/-0.5Ex+/-0.5Ey)$ or $Eo'=(Eo+/-Ex\gg 1+/-Ey\gg 1)$
where $\gg$ is shift right To this end, the coefficients may be modified by a same first predetermined amount, but the sign by which the coefficients are modified (i.e. + or −) may differ. With respect to the present embodiment, the sign may be selected based on the direction and orientation of the edge, as configured in Table 1.

Further, in step 306 the primitive is further enlarged by shifting each edge of the primitive by an error term. The error term may be a second predetermined amount that is less than the first predetermined amount used to shift the position of the primitive. Thus, the primitive may be enlarged by both the first predetermined amount and the error term. In step 308, the bounding box computed for the primitive is also enlarged by shifting each edge of the bounding box. For example, the each edge of the bounding box may be shifted by the error term used to enlarge the primitive.

It is then determined in step 310 whether the pixel sample intersects the enlarged primitive. If it is determined that the pixel sample does not intersect the enlarged primitive, it is determined in step 312 that the pixel does not intersect the primitive. If, however, it is determined in step 310 that the pixel sample does intersect the enlarged primitive, it is further determined in decision 314 whether the pixel sample intersects the enlarged bounding box. If it is determined that the pixel sample does not intersect the enlarged bounding box, it is determined in step 312 that the pixel does not intersect the primitive. However, if it is determined in decision 314 that the pixel sample does intersect the enlarged bounding box, the pixel is determined to intersect the primitive. Note step 316.

Figure 3B:
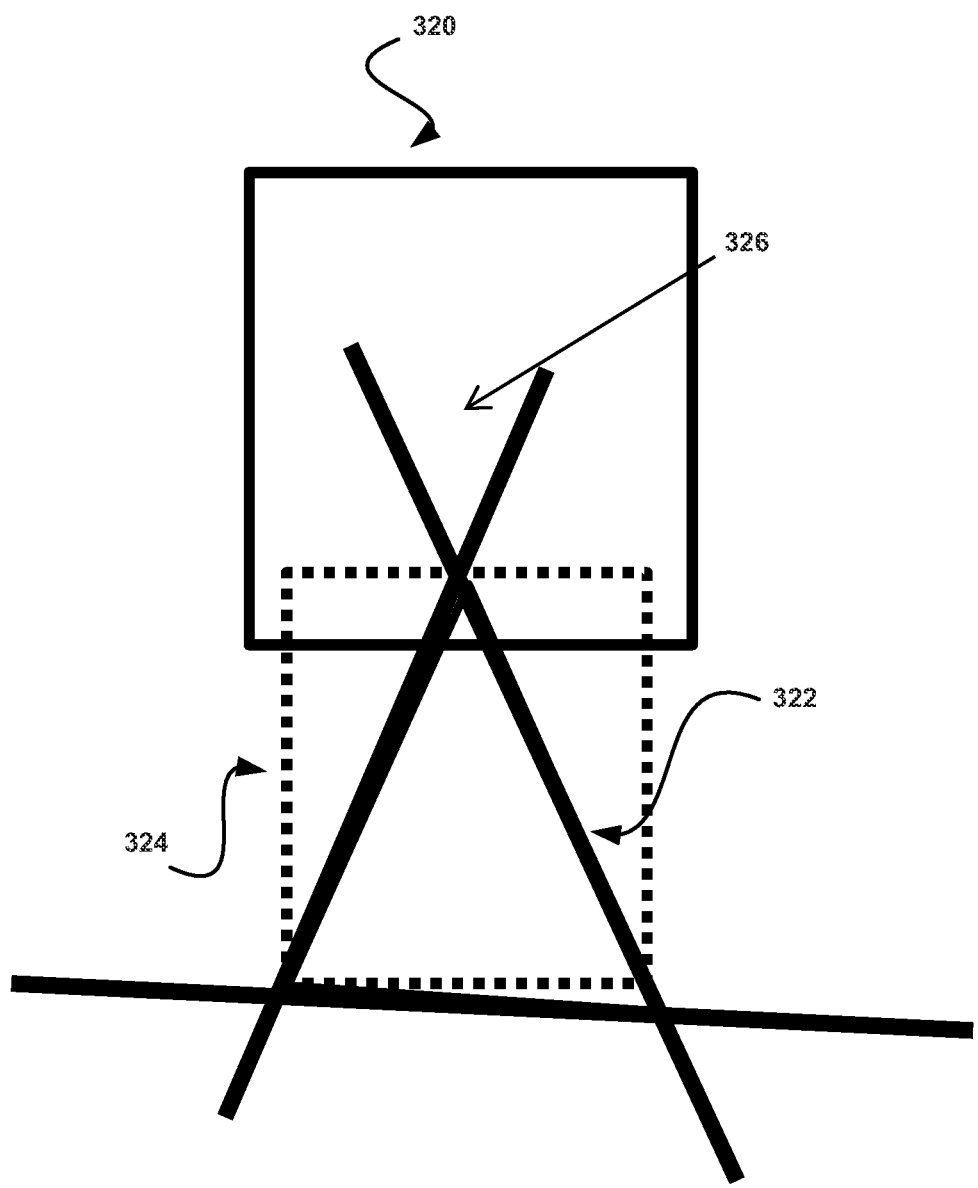
FIG. 3B illustrates a pixel intersecting a primitive, in accordance with another embodiment.

FIG. 3B illustrates a pixel 320 intersecting a primitive 322, in accordance with another embodiment. As shown, each edge has at least one pixel corner 326 that is inside that edge. Additionally, the bounding box 324 of the primitive 322 intersects the pixel 320. As a result of both the bounding box 324 of the primitive 322 intersecting the pixel 320 and each edge having at least one pixel corner 326 that is inside that edge, it is determined that the pixel intersects the primitive.

Figure 4:
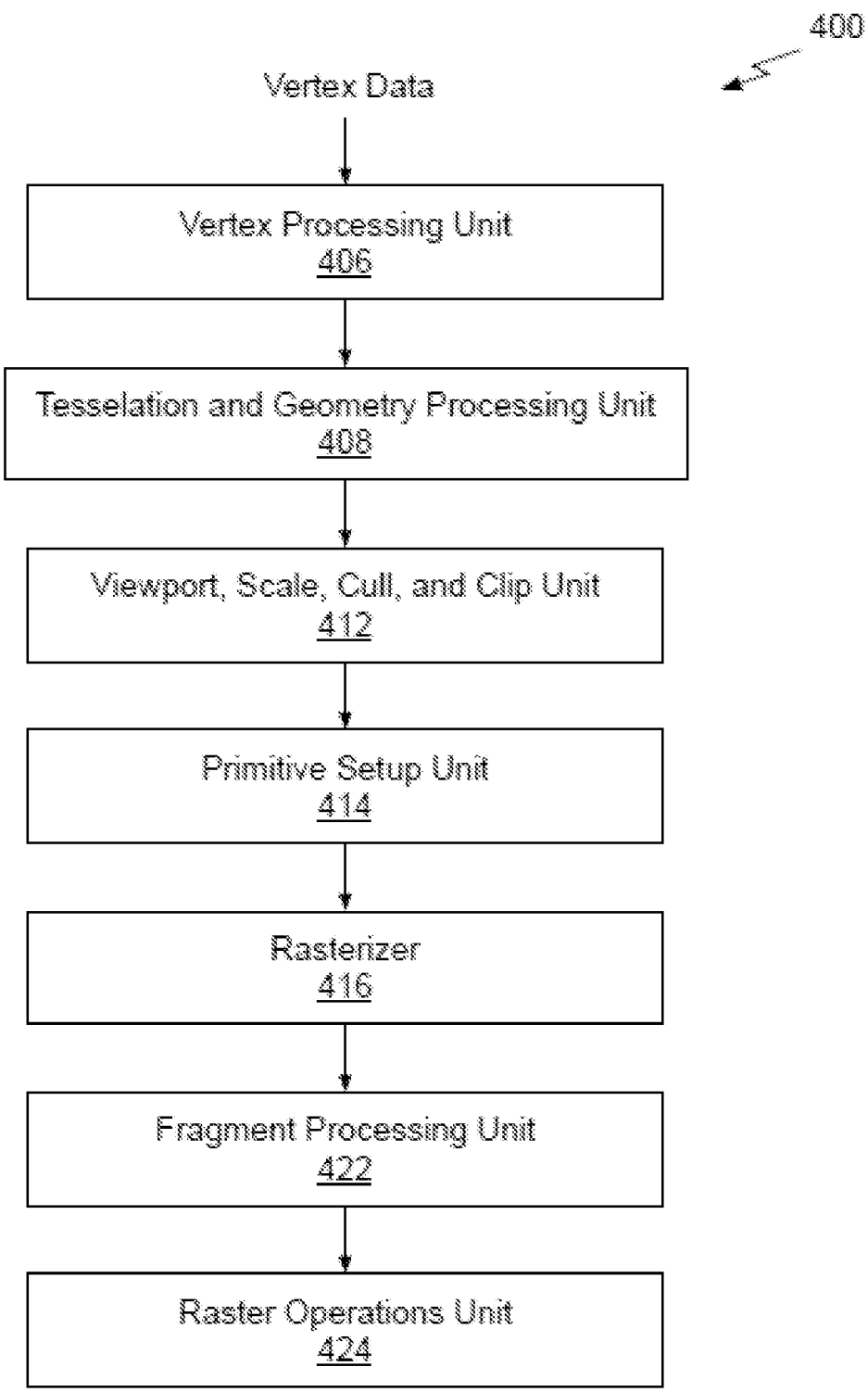
FIG. 4 illustrates a graphics processing pipeline, in accordance with still yet another embodiment.

FIG. 4 illustrates a conceptual graphics processing pipeline 400, in accordance with one embodiment. As an option, the graphics processing pipeline 400 may be implemented to carry out the methods of FIGS. 1-3A. Of course, however, the graphics processing pipeline 400 may be implemented in any desired environment. Again, it should be noted that the aforementioned definitions may apply during the present description.

The graphics processing pipeline 400 may be implemented using a programmable processing unit or using dedicated processing units for one or more functions. A vertex processing unit 406 is a programmable execution unit that is configured to execute vertex shader programs, lighting and transforming vertex data as specified by vertex shader programs. For example, the vertex processing unit 406 may be programmed to transform the vertex data from an object-based coordinate representation (object space) to an alternatively based coordinate system such as world space or normalized device coordinates (NDC) space.

The tessellation and geometry processing unit 408 is a programmable execution unit that is configured to execute tessellation shader programs. The tessellation and geometry processing unit 408 processes vertices produced by the vertex processing unit 406 and may be configured to generate graphics primitives known as patches and various patch attributes. In some embodiments, the tessellation and geometry processing unit 408 may also perform topology configuration, indexing the vertices, including vertices associated with patches, and compute texture coordinates corresponding to the vertices. The tessellation and geometry processing unit 408 may also be configured to execute geometry shader programs, thereby transforming graphics primitives. Vertices are grouped to construct graphics primitives for processing, where graphics primitives include triangles, line segments, points, and the like. For example, the tessellation and geometry processing unit 408 may be programmed to subdivide the graphics primitives into one or more new graphics primitives and calculate parameters, such as plane equation coefficients, that are used to rasterize the new graphics primitives. In some embodiments, the tessellation and geometry processing unit 408 may also add or delete elements in the geometry stream. The tessellation and geometry processing unit 408 outputs the parameters and vertices specifying new graphics primitives to a viewport scale, cull, and clip unit 412.

The viewport scale, cull, and clip unit 412 receives geometric data related to an object and executes a viewport transform on the geometric data, to produce coordinates for the vertices of the object in two-dimensional screen-space. A viewport processing unit within the viewport scale, cull, and clip unit 412 may be configured to perform the viewport transform, varying the snap spacing based on the viewport resolution. A certain resolution (e.g., width and height in pixels) that generally corresponds to a two-dimensional grid or space is specified for the viewport transform. The coordinates of the vertices of the object in the two-dimensional space have values that correspond to this resolution. Thus, for a resolution of 320×240 pixels, horizontal coordinates for vertices of an object can range from 0 to 320, and vertical coordinates can range from 0 to 240. For other resolutions, coordinates can have different ranges.

Calculations for the viewport transform typically include some rounding. That is, coordinates that result from the viewport transform have a certain amount of rounding applied, meaning that the results of the calculations for generating the screen-space vertices are rounded to a certain precision. The viewport transform also "snaps" coordinates for the object vertices to a specified sub-pixel grid. In other words, the screen-space positions for the vertices of the object that has had a viewport transform applied are aligned with a grid, where the cells (or "sub-pixels") of the grid have a size equal to a specified fraction of a pixel (for example, all cells in the grid may have a size equal to ¼th or ¹⁄₆₄th of a pixel). The snap spacing controls the precision to which vertices are snapped relative to the resolution of the viewport. The snap spacing is the dimension (height or width) of the cells in the grid and is specified as a fraction of a pixel. The "snapping" causes the coordinates of an object to be aligned with the sub-pixel grid. The results of the viewport transform include the effects of the snapping and rounding and generally include screen-space coordinates for each vertex of each object, aligned to the sub-pixel grid.

The viewport scale, cull, and clip unit 412 performs clipping, culling, and viewport scaling and outputs processed graphics primitives to a primitive setup unit 414. The primitive setup unit 414 computes the edge equation coefficients for each edge of each primitive (e.g., start values, delta_x, delta_y, the edge slopes, etc.). When snapping is used, an edge may be defined by two of the adjusted (i.e., snapped) vertices of a primitive.

The setup unit 414 may be configured to compensate for inconsistencies resulting from snapping by enlarging the primitive by the error term and by enlarging the bounding box by the error term. In one embodiment, the setup unit 414 determines a starting tile based on the top leftmost vertex. All edge equations are based on the starting tile. At the output of the setup unit 414, the edge coefficients are in fixed point and are exactly precise in all cases. So re-referencing the edge equations at this point will not change the primitive location or shape. In other words, from the setup unit 414 through the downstream processing unit in the graphics processing pipeline, conservative rasterization is consistent.

The error term that is incorporated into the coefficients for the edge equations may take into account the enlarging and also a half pixel shifting needed to make the center pixel sample look like a corner point of each pixel. Note that the half pixel shifting can be performed by either bloating the edges by ½ pixel or by doing a shift from center-to-corner.

$$Eo+Ex(\text{starting\_tileX}\_16\times16+/-\text{errorX})+Ey(\text{starting\_tileX}\_16\times6+/-\text{errorY})$$

The sign of the error term is determined by the edge orientation and direction. Table 1 above shows the configuration for determining the sign.

For conservative rasterization, all edges of a primitive are inclusive meaning if the edge lies exactly on the sample point, the sample point is on the primitive. Any logic that exists in the setup unit 414 to make the left/top edges inclusive and the right/bottom exclusive may be capable of being disabled. The bounding box computed by the setup unit 414 is inclusive in terms of the edges, however the bounding box may be enlarged by the absolute value of the error terms. If the bounding box sides are snapped to the closest sample point that lies inside the bounding box, this shrinking of the bounding box must be disabled. The setup unit 414 may be configured to compute the bounding box dimensions with 8 fractional bits and that are truncated to 4 fractional bits at the output of the setup unit 414. The truncation may floor the left and top sides of the bounding box, and ceiling the right and bottom sides when truncating to 4 fractional bits.

Zero Area Primitives

A technique to rasterize zero area primitives may be employed, optionally in the context of the setup unit 414. Initially, a primitive having zero area resulting from colinear vertices is identified. A minimum vertex and a maximum vertex of the primitive are determined to define the primitive as a line. Further, attributes may be interpolated along the line.

Just by way of example, zero area primitives can result in a point, or line. They may occur due to snapping or imprecision upstream. Zero area primitive may be processed by setup. Thus, zero area primitives may be treated as a point or a line. Even though the primitive is enlarged (e.g. by at least 0.5 pixel), the setup unit 414 starts with a line. The setup unit 414 may be configured to change from a triangle primitive to line or point mode after the area of the primitive is computed. If all three vertices are collocated a point is drawn, and if 2 vertices are collocated a line is drawn. If none of the three vertices are collocated but still zero area, the two vertices of the line are the two that lie on the bounding box.

The rasterizer 416 receives the screen-space coordinates for vertices of an object and the edge equation coefficients from the primitive setup unit 414. Thus, the edge equation coefficients received by the rasterizer 416 may be those modified to enlarge the primitive. The rasterizer 416 takes primitives and edge equations from the setup unit and evaluates the edge equations provided by the primitive setup unit 414 to determine coverage of samples or pixels for the object. The rasterizer 416 scan converts the new graphics primitives and outputs fragments and coverage data to fragment processing unit 460. Additionally, the rasterizer 416 may be configured to perform z culling and other z-based optimizations. In one embodiment the rasterizer 416 may be implemented as a coarse rasterizer that computes coarse coverage information and a fine rasterizer that computes coverage information at a sub-pixel granularity.

Conservative Depth

In some cases it is desirable to have conservative depth (e.g. for Z cull, conservative compression, etc.). Initially, a Z anchor for a triangle or tile of pixels is identified. For example, there may be a per primitive anchor computed by Setup, or optionally from that per primitive anchor, fine raster may compute a per tile anchor. The Z anchor is then offset by a predetermined fraction of the pixel to place the Z anchor at a corner of the pixel. Optionally, the anchor offset could be applied either in Setup (per primitive) or in fine raster (per tile). The Z anchor placed at the corner of the pixel is then evaluated to provide one of a maximum Z value or a minimum Z value for the pixel.

Just by way of example, conservative depth can be accomplished by determining the Z-slope direction and evaluating Z at the minimum or maximum corner of a tile. If Z is computed based on plane equation, for example if Z is computed as:

$$Z = Z0 + dz/dx * \text{delta\_x} + dz/dy * \text{delta\_y}$$

where delta_x and delta_y describe sample positions, evaluation of Z at the minimum or maximum corner can be accomplished by offsetting the Z anchor (Z0) by ½ of a pixel toward the minimum or maximum Z, for example $$Z0 + = dz/dx * 0.5 + dz/dy * -0.5$$

to compute the maximum Z per pixel if Z increases with X and decreases with y.

The fragment processing unit 422 is a programmable execution unit that is configured to execute fragment shader programs, transforming fragments received from the rasterizer 416, as specified by the fragment shader programs. For example, the fragment processing unit 422 may be programmed to perform operations such as perspective correction, texture mapping, shading, blending, and the like, to produce shaded fragments that are output to raster operations unit 424. The fragment processing unit 422. Fragments may be shaded at pixel, sample, or other granularity, depending on the programmed sampling rate.

The raster operations unit 424 is a processing unit that performs raster operations, such as stencil, z test, blending, and the like, and outputs pixel data as processed graphics data for storage in graphics memory. The processed graphics data may be stored in memory, for display or for further processing. In some embodiments of the present invention, raster operations unit 424 is configured to compress z or color data that is written to memory and decompress z or color data that is read from memory.

Figure 4B:
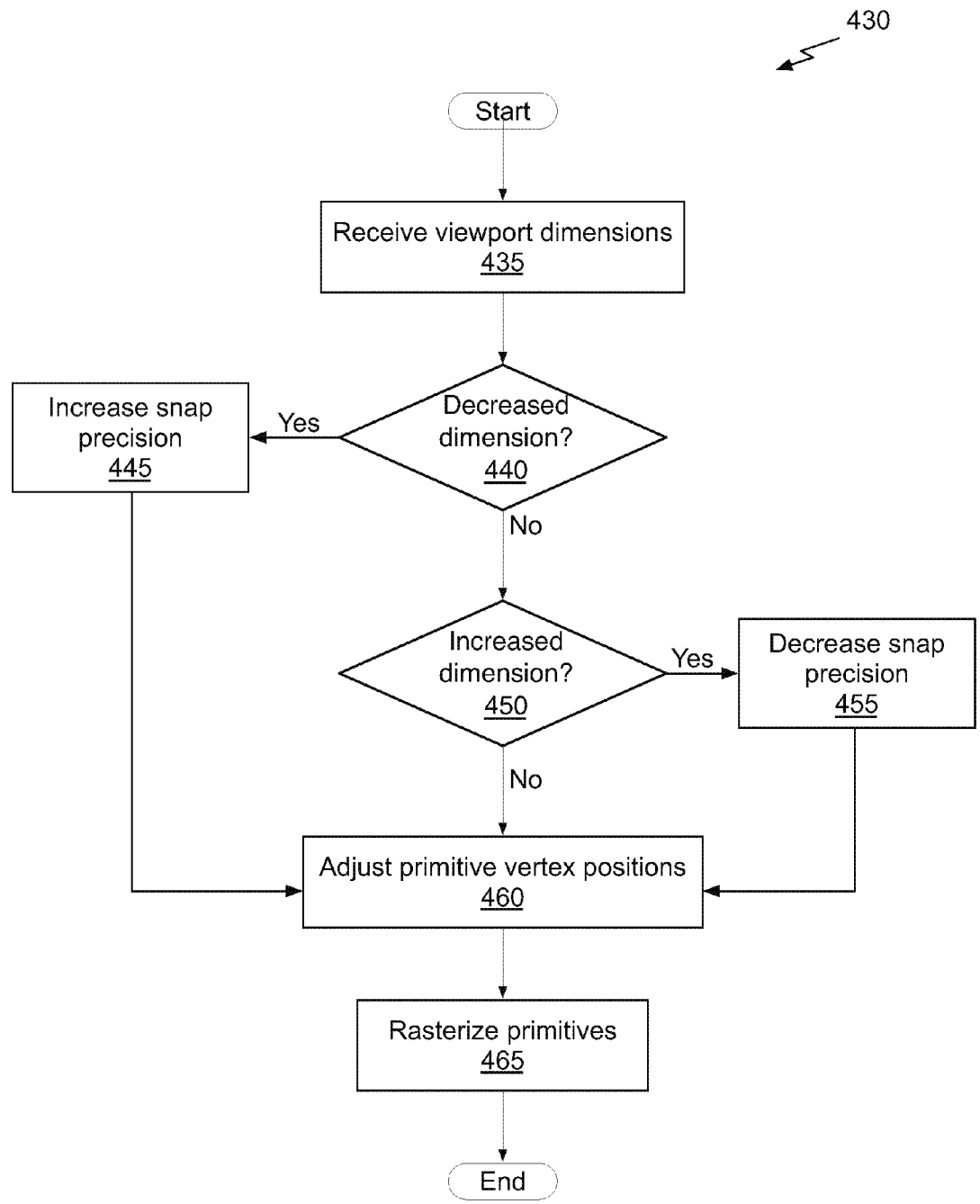
FIG. 4B illustrates another flowchart of a method for adjusting vertex positions based on a snap spacing, in accordance with one embodiment.

FIG. 4B illustrates another flowchart of a method 430 for adjusting vertex positions, in accordance with one embodiment. The steps shown in method 430 may be performed by an application program, such as a vertex shader that is executed by a graphics processor. The steps shown in method 430 may be performed by a processing unit within a graphics processor, such as the viewport scale, cull, and clip unit 412. At step 435, an application program or a processing unit receives viewport dimensions. At step 440, the method determines if the viewport dimensions have decreased such that the snap precision should be changed, and, if so, at step 445 the snap spacing precision is increased. Otherwise, at step 450, the method determines if the viewport dimensions have increased such that the snap precision should be changed, and, if so, at step 455 the snap spacing precision is decreased. Otherwise, the snap spacing is unchanged.

At step 460 the primitive vertex positions are adjusted to a sub-pixel grid according to the viewport dependent snap spacing to produce snapped vertex positions. At step 465 the primitives defined by the snapped vertex positions are rasterized.

Figure 5:
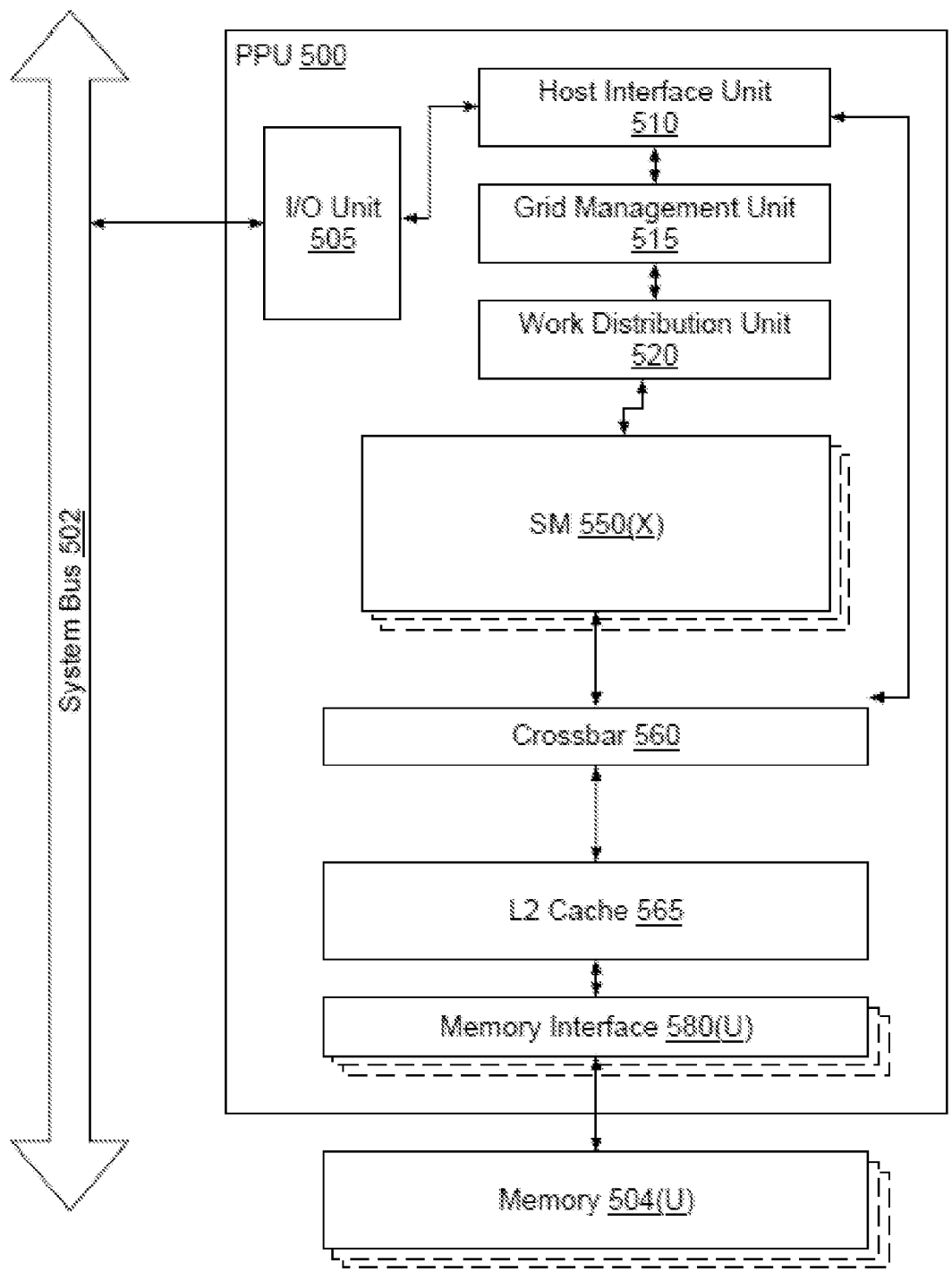
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

In one embodiment, the PPU 500 includes an input/output (I/O) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. In the context of the grid management unit 515, a grid is a quantity of processing work. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550(X). For example, the PPU 100 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network).

The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. The GMU 515 may configure one or more SMs 550 to perform the functions of one or more of the processing units shown in FIG. 4A, e.g., a vertex processing unit, a tessellation processing unit, a geometry processing unit, and a fragment processing unit. The functions of viewport scale, cull, and clip processing unit, coarse rasterizer, fine rasterizer, and raster operations unit may also be performed by other processing engines within a GMU 515.

For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

Figure 6:
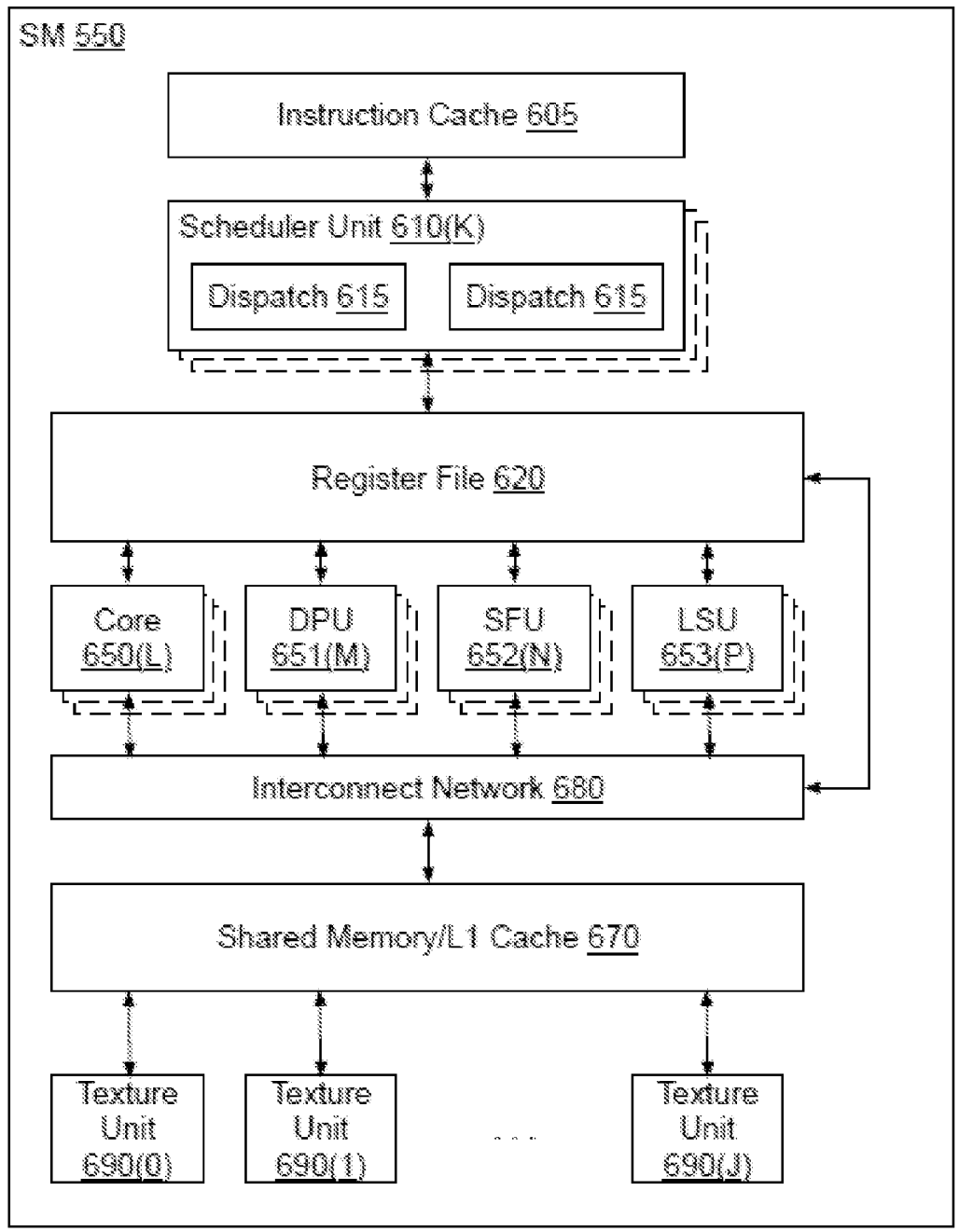
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
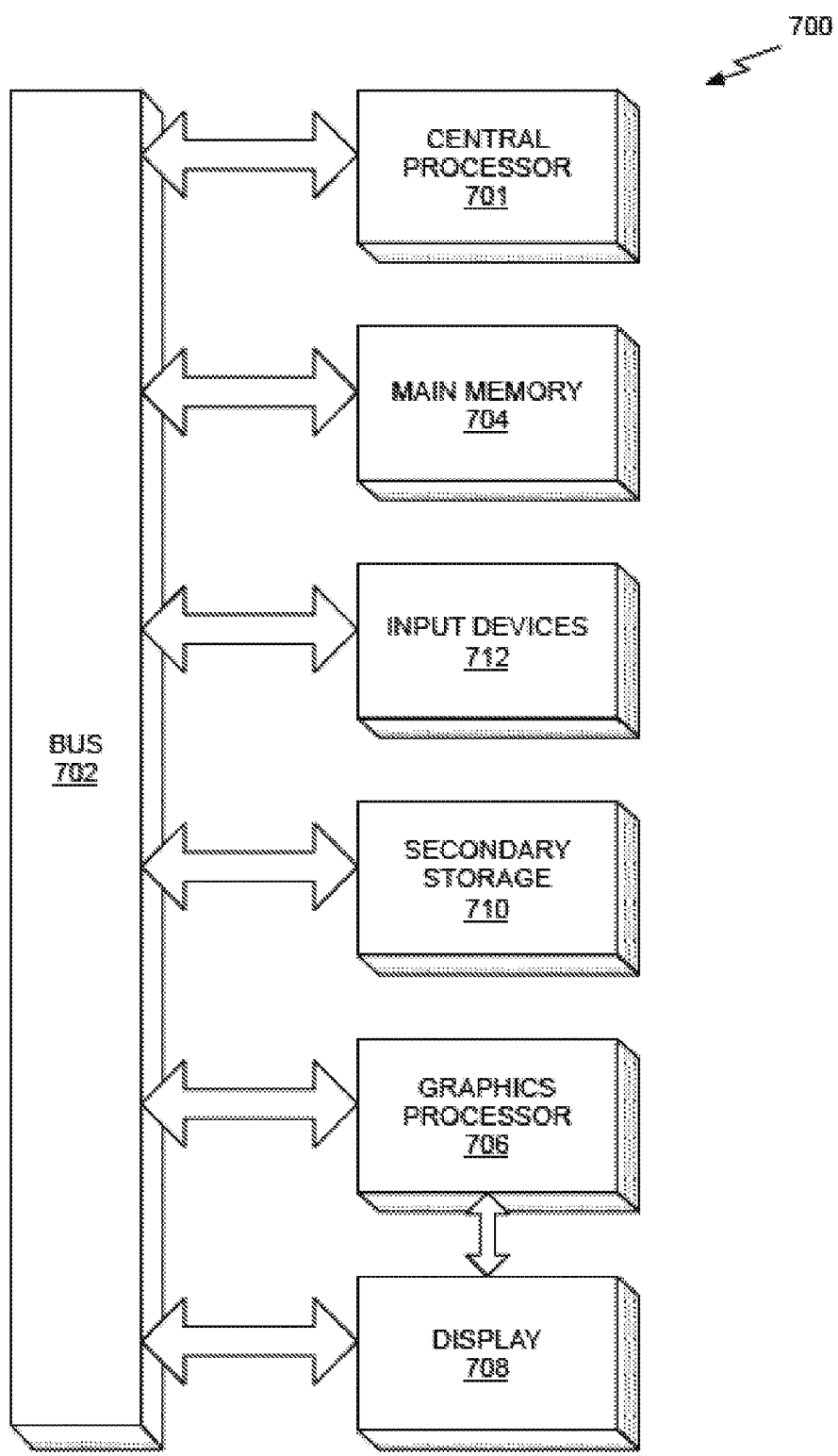
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for rasterizing a primitive, comprising:
   determining an edge equation for each edge of a primitive, the edge equation having coefficients defining the edge of the primitive;
   shifting each edge of the primitive to enlarge the primitive by modifying at least two coefficients of the edge equation defining the edge by an error term that is a first predetermined amount;
   additionally shifting each edge of the primitive to further enlarge the primitive by further modifying the at least two coefficients of the edge equation defining the edge by a second predetermined amount, wherein the second predetermined amount is equal to the first predetermined amount; and
   determining pixels that intersect the primitive, using the enlarged primitive.

2. The method of claim 1, wherein the coefficients of each edge equation are computed from vertices of the primitive that have been snapped to a fixed number of fractional bits.

3. The method of claim 2, wherein the first predetermined amount is one half of a distance by which the edge of the primitive has been snapped.

4. The method of claim 1, wherein when the first amount is a power of 2, modifying the at least two coefficients of the edge equation by the error term includes shifting coefficients of the edge equation based on the predetermined amount.

5. The method of claim 1, further comprising:
   determining a bounding box for the edges of the primitive; and
   shifting each edge of the bounding box to enlarge the bounding box.

6. The method of claim 5, wherein each edge of the bounding box is shifted by:
   modifying each edge of the bounding box by the error term that is the first predetermined amount.

7. The method of claim 5, further comprising determining that a pixel does not intersect the primitive when the pixel intersects the enlarged primitive and the pixel does not intersect the enlarged bounding box.

8. The method of claim 1, wherein the coefficients of the edge equation are fixed point values.

9. A method for rasterizing a primitive comprising:
   determining an edge equation for each edge of a primitive, the edge equation having coefficients defining the edge of the primitive;
   shifting each edge of the primitive to enlarge the primitive by modifying at least two coefficients of the edge equation defining the edge by an error term that is a first predetermined amount;
   additionally shifting each edge of the primitive to further enlarge the primitive by further modifying the at least two coefficients of the edge equation defining the edge by a second predetermined amount, wherein the second predetermined amount is a predetermined fraction of a size of a pixel; and
   determining pixels that intersect the primitive, using the enlarged primitive.

10. The method of claim 9, wherein the second predetermined amount by which the coefficients are modified is one half of the size of the pixel.

11. A method for rasterizing a primitive, comprising:
    determining an edge equation for each edge of a primitive, the edge equation having coefficients defining the edge of the primitive;
    shifting each edge of the primitive to enlarge the primitive by modifying at least two coefficients of the edge equation defining the edge by an error term that is a first predetermined amount;
    additionally shifting each edge of the primitive to further enlarge the primitive by further modifying the at least two coefficients of the edge equation defining the edge by a second predetermined amount, wherein the first predetermined amount is less than the second predetermined amount; and
    determining pixels that intersect the primitive, using the enlarged primitive.

12. A non-transitory computer-readable storage medium storing instructions that, when executed by a processor, perform a method to rasterize a primitive, the method comprising:
    determining an edge equation for each edge of a primitive, the edge equation having coefficients defining the edge of the primitive;
    shifting each edge of the primitive to enlarge the primitive by modifying at least two coefficients of the edge equation defining the edge by an error term that is a first predetermined amount;
    additionally shifting each edge of the primitive to further enlarge the primitive by further modifying the at least two coefficients of the edge equation defining the edge by a second predetermined amount, wherein the second predetermined amount is equal to the first predetermined amount; and
    determining pixels that intersect the primitive, using the enlarged primitive.

13. The non-transitory computer-readable storage medium of claim 12, wherein the coefficients of the edge equation are fixed point values.

14. The non-transitory computer-readable storage medium of claim 12, further comprising:
   determining a bounding box for the edges of the primitive;
   shifting each edge of the bounding box to enlarge the bounding box; and
   determining that a pixel does not intersect the primitive when the pixel intersects the enlarged primitive and the pixel does not intersect the enlarged bounding box.

15. A system comprising:
   a processor configured for:
      determining an edge equation for each edge of a primitive, the edge equation having coefficients defining the edge of the primitive;
      shifting each edge of the primitive to enlarge the primitive by modifying at least two coefficients of the edge equation defining the edge by an error term that is a first predetermined amount;
      additionally shifting each edge of the primitive to further enlarge the primitive by further modifying the at least two coefficients of the edge equation defining the edge by a second predetermined amount, wherein the second predetermined amount is equal to the first predetermined amount; and
      determining pixels that intersect the primitive, using the enlarged primitive.

16. The system of claim 15, wherein the coefficients of the edge equation are fixed point values.

17. The system of claim 15, wherein the processor is further configured to:
   determine a bounding box for the edges of the primitive;
   shift each edge of the bounding box to enlarge the bounding box; and
   determine that a pixel does not intersect the primitive when the pixel intersects the enlarged primitive and the pixel does not intersect the enlarged bounding box.

* * * * *